(12) United States Patent
Kuo

(10) Patent No.: US 9,817,441 B1
(45) Date of Patent: Nov. 14, 2017

(54) DOCK

(71) Applicant: GETAC TECHNOLOGY CORPORATION, Hsinchu County (TW)

(72) Inventor: Hsiu-Yu Kuo, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

(21) Appl. No.: 15/450,042

(22) Filed: Mar. 6, 2017

(51) Int. Cl.
*G06F 1/16* (2006.01)
*H05K 7/00* (2006.01)
*H01R 13/447* (2006.01)

(52) U.S. Cl.
CPC ......... *G06F 1/1632* (2013.01); *H01R 13/447* (2013.01)

(58) Field of Classification Search
CPC .......................................................... G06F 1/16
USPC .................................................... 361/679.21
See application file for complete search history.

(56) References Cited

U.S. PATENT DOCUMENTS

| | | | |
|---|---|---|---|
| 6,870,730 B2* | 3/2005 | Riddiford | G06F 1/1616 248/917 |
| 2014/0037372 A1* | 2/2014 | Chang | H05K 5/0221 403/327 |

\* cited by examiner

*Primary Examiner* — Jerry Wu

(57) ABSTRACT

A dock includes a base, a fixing switch, a release component, a connector, and a connection component. When an electronic device is mounted on the base, the release component must be pressed in order for the fixing switch to be operable, allowing the connection component to drive the connector to connect with the electronic device. When no electronic device is mounted on the base, the connector is received in the base to protect the connector against damage while the dock is being carried around. That the release component must be pressed in order for the fixing switch to be movable protects the connector against damage in a situation where, while the dock is being carried around, the fixing switch is inadvertently pushed, causing the connector to protrude from the dock.

10 Claims, 5 Drawing Sheets

DOCK

BACKGROUND OF THE INVENTION

Field of the Invention

The present invention relates to docks and, more particularly, to a dock capable of hiding a connector.

Description of the Prior Art

Although a tablet is lightweight and portable, it cannot be connected to an excessive number of connectors because of the trend toward to thin, lightweight tablets. As a result, a user may need to use a tablet to control various apparatuses but cannot directly connect the apparatuses to the tablet; instead, the user has to connect the tablet to a dock whereby the apparatuses can be connected to the tablet.

A conventional dock usually has its connector protruding from the dock for two reasons: allowing an apparatus to be connected to the connector quickly; and rendering the manufacturing process of the dock convenient and free from any additional mechanism. Furthermore, the dock can come with any other locking structure whereby a tablet can be firmly fixed to the dock after being connected thereto.

SUMMARY OF THE INVENTION

Since a conventional dock is designed to have its connector protruding from the dock, the odds are that the connector may be inadvertently hit and thus damaged while the dock not connected to any tablet is being carried around. Moreover, the connector protruding from the dock is likely to be hit because of bad alignment and thus damaged while a user is trying to mount the tablet on the dock.

In view of this, the present invention provides, in an embodiment, a dock which comprises a base, a fixing switch, a release component, a connector, and a connection component. The base has a press aperture and a connection aperture which are penetratingly disposed on an upper surface of the base, the base having therein a receiving space. The fixing switch is penetratingly disposed on the upper surface of the base. The release component comprises a release switch and resilient elements. The release switch has a press portion and a stop portion. The press portion passes through the press aperture to protrude from the upper surface of the base. The stop portion is received in the receiving space. The resilient elements are received in the receiving space and abut against the release switch to allow the release switch to move to a stop position or release position. The connector is received in the receiving space of the base and corresponds in position to the connection aperture.

The connection component is disposed at the base to connect the fixing switch and the connector. The connection component comprises a movable plate and an engaging element. When the release switch is at the stop position, the stop portion abuts against the engaging element and stops the movable plate, the connector, and the fixing switch from moving. When the release switch is at the release position, the fixing switch is moved to a locked position to drive the connection component to move to a connected position, allowing the connection component to push an end of the connector so that the end of the connector passes through the connection aperture to protrude from the upper surface of the base.

Given the aforesaid structures, when the tablet is not mounted on the dock, the release switch is at the stop position, and the release switch renders the fixing switch unmovable, allowing the connector to be received in the base without protruding from the upper surface of the base. Therefore, the connector is unlikely to be damaged while the dock is being carried around, regardless of whether the upper surface of the dock is hit by any object.

To mount the tablet on the dock, the user places the tablet on the upper surface of the base so that the tablet presses on the release switch to enable the release switch to move to the release position. Afterward, the user operates the fixing switch so that the fixing switch drives the connection component to move to the connected position. At this point in time, the connector is pushed by the connection component to protrude from the upper surface of the base and connect with the tablet disposed on the upper surface of the base; hence, the connector is unlikely to be damaged while the dock is being carried around. It is only after the user has correctly positioned the tablet on the dock that the user can operate the fixing switch, allowing the connector to protrude from the upper surface of the base and thus connect with the tablet; hence, the tablet is correctly positioned on the base to protect the connector against damage. Moreover, it is only after the user has pressed and moved the release switch to the release position that the fixing switch can be moved; hence, it is feasible to preclude the situation where, while the dock is being carried around, the fixing switch is inadvertently pushed, causing the connector to protrude from the dock.

DETAILED DESCRIPTION OF THE EMBODIMENTS

Figure 1:
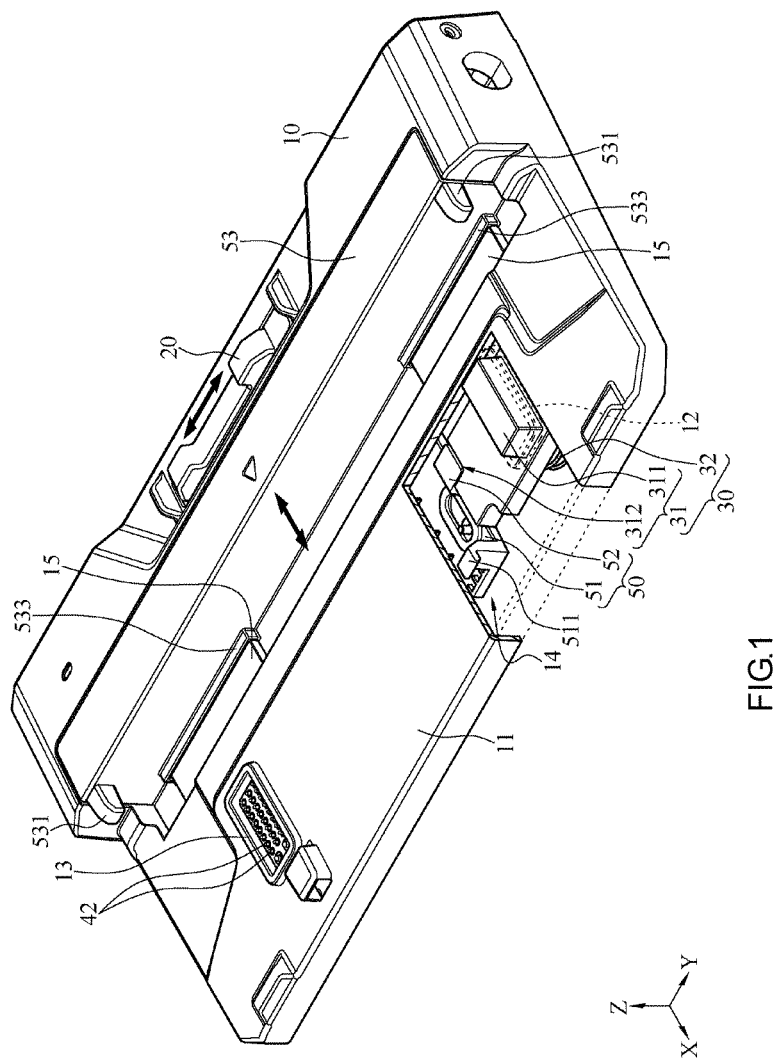
FIG. 1 is a perspective view of a dock with its fixing switch at the initial position according to an embodiment of the present invention.
Figure 2:
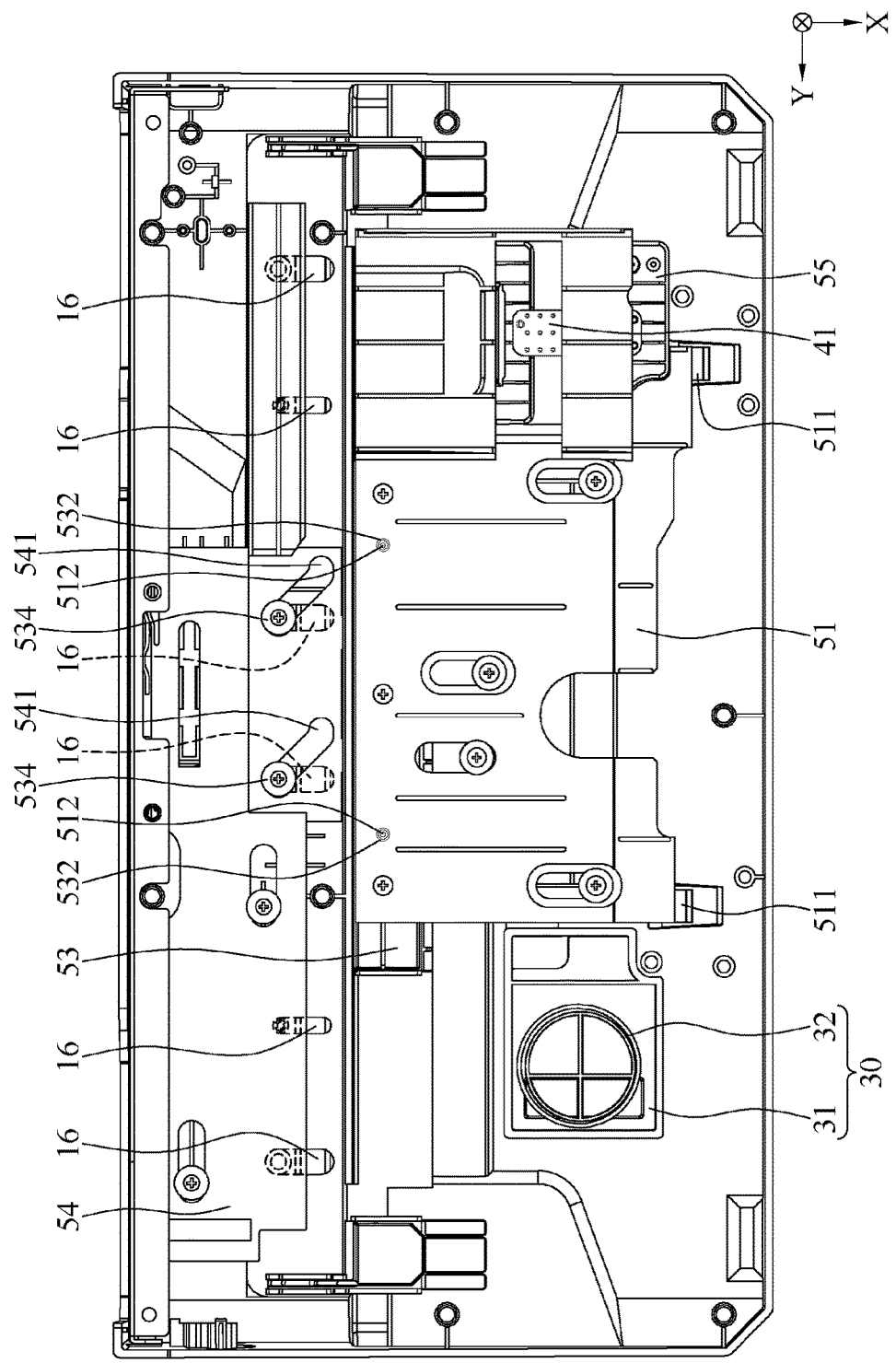
FIG. 2 is a schematic view of the inside of the dock which hides a bottom casing of a base of the dock according to an embodiment of the present invention.
Figure 3:
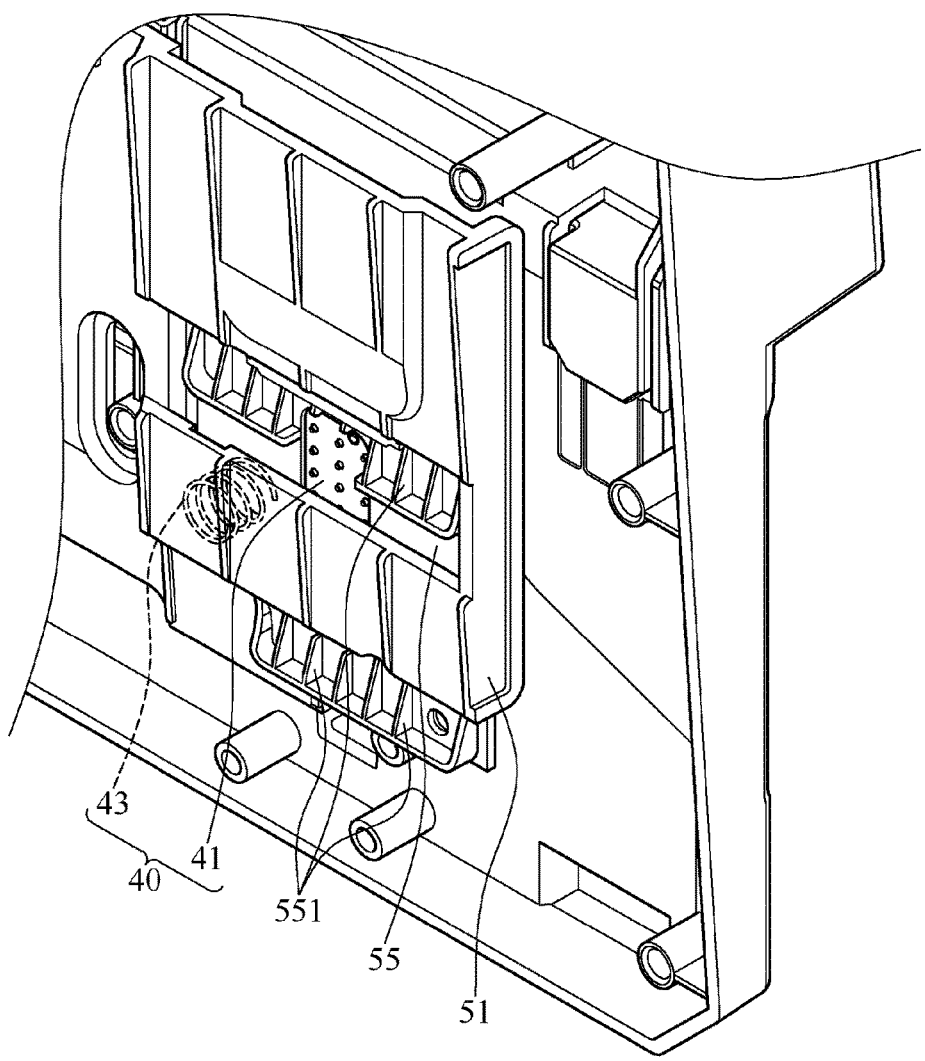
FIG. 3 is a schematic view of a connector and a connection component according to an embodiment of the present invention.

Referring to FIG. 1 through FIG. 3, FIG. 1 is a perspective view of a dock with its fixing switch at the initial position according to an embodiment of the present invention, FIG. 2 is a schematic view of the inside of the dock which hides a bottom casing of a base of the dock according to an embodiment of the present invention, and FIG. 3 is a schematic view of a connector and a connection component according to an embodiment of the present invention. Fine structures of the dock and connection relationships thereof are hereunder described and illustrated by FIGS. 1-3, and then the operation of the dock is described. Referring to FIG. 1 through FIG. 3, in this embodiment, the dock comprises a base 10, a fixing switch 20, a release component 30, a connector 40, and a connection component 50.

A press aperture 12 and a connection aperture 13 are penetratingly disposed on an upper surface 11 of the base 10. A receiving space 14 is formed inside the base 10. The fixing switch 20 is also penetratingly disposed on the upper surface 11 of the base 10. Referring to FIG. 1, the fixing switch 20 is disposed at the upper edge of the base 10, but the present invention is not limited thereto, because the fixing switch 20 can also be disposed at any point of the base 10, provided that the fixing switch 20 is able to drive, and move together with, the connection component 50.

Referring to FIG. 1 and FIG. 2, the release component 30 comprises a release switch 31 and a first resilient element 32. The release switch 31 has a press portion 311 and a stop portion 312. The press portion 311 passes through the press aperture 11 of the base 10 to protrude from the upper surface 11 of the base 10. The stop portion 312 is received in the receiving space 14. The first resilient element 32 is received in the receiving space 14 and abuts against the release switch 31 so that the release switch 31 can move to a stop position or a release position. When the fixing switch 20 of the dock is at the initial position shown in FIGS. 1, 2, the release switch 31 is at the stop position; meanwhile, the first resilient element 32 is snugly fitted between the base 10 and the release switch 31, whereas the press portion 311 of the release switch 31 is pushed to pass through the press aperture 12 and protrude from the upper surface 11 of the base 10. When a tablet is placed on the upper surface 11 of the base 10, the casing of the tablet presses against the press portion 311 protruding from the upper surface 11 and thus presses on the release switch 31. As a result, the release switch 31 is moved to the release position (as described later.)

The connector 40 is received in the receiving space 14 of the base 10 and corresponds in position to the connection aperture 13. In this embodiment, the connector 40 comprises a circuit board 41, a plurality of spring connectors 42, and a second resilient element 43. The spring connectors 42 are disposed on the circuit board 41 and correspond in position to the connection aperture 13. Referring to FIG. 3, the second resilient element 43 is snugly fitted between the base 10 and the circuit board 41.

Referring to FIG. 1 and FIG. 2, the connection component 50 is disposed in the base 10 and connected to the fixing switch 20 and the connector 40. The connection component 50 comprises a movable plate 51, an engaging element 52, a fastening element 53, a diversion guide element 54, and a push element 55. The movable plate 51 is received in the receiving space 14 and laterally flanked by two hooks 511. Although in this embodiment the hooks 511 are in the number of two, the present invention is not limited thereto.

The engaging element 52 is connected to the movable plate 51. The engaging element 52 is disposed at the movable plate 51 and positioned proximate to the release switch 31. When the fixing switch 20 of the dock is at the initial position, the engaging element 52 is positioned at the stop portion 312. Referring to FIG. 1 and FIG. 2, when the release switch 31 is at the stop position, the stop portion 312 abuts against and stops the engaging element 52. With the engaging element 52 being stopped from moving, none of the movable plate 51, the connector 40 and the fixing switch 20 can move.

One end of the fastening element 53 extends to the receiving space 14 and connects with the movable plate 51. The fastening element 53 is connected to the movable plate 51 by a locking mechanism. In this embodiment, a plurality of holes 512 is penetratingly disposed on the movable plate 51, and a plurality of cylinders 532 is disposed on the movable plate 51 and corresponds in position to the fastening element 53. The cylinders 532 are penetratingly disposed in the holes 512, respectively, so that, by hot-fusion, the ends of the cylinders 532 are engaged with the movable plate 51 and thus fixed thereto. The other end of the fastening element 53 extends to the upper surface 11 of the base 10. Referring to FIG. 1, the fastening element 53 looks Z-shaped when disposed on the upper surface 11 of the base 10, and a fastening portion 531 is disposed on the fastening element 53. In this embodiment, the fastening portion 531 is provided in the form of two protruding posts 531 disposed at two ends of the fastening element 53, respectively. The fastening portion 531 fastens the tablet in place. The base 10 further has a rail 15. The fastening element 53 has a U-shaped slot 533. The U-shaped slot 533 of the fastening element 53 is slidingly disposed in the rail 15 so that the fastening element 53 is guided by the rail 15 to slide. Referring to FIG. 1, this embodiment provides two rails 15 and two U-shaped slots 533, but the present invention is not limited thereto. In a variant embodiment, the rails 15 and the U-shaped slots 533 are in the number of one or more than two.

The diversion guide element 54 is received in the receiving space 14. The diversion guide element 54 connects the fixing switch 20 and the fastening element 53 to allow the fixing switch 20 and the fastening element 53 to move in directions perpendicular to each other, respectively. Hence, when guided by the diversion guide element 54, the fixing switch 20 moves along y-axis, and the fastening element 53 moves along x-axis, as shown in FIG. 1. Referring to FIG. 2, the base 10 has thereon a plurality of first guide grooves 16, and the diversion guide element 54 has thereon a plurality of second guide grooves 541. The fastening element 53 has a plurality of positioning elements 534. The positioning elements 534 each pass through and are slidingly disposed in one first guide groove 16 and one second guide groove 541.

The push element 55 is disposed between the circuit board 41 of the connector 40 and the movable plate 51 of the connection component 50. As shown in FIG. 3, a plurality of ribs 551 is disposed on a lateral surface of the push element 55, wherein the lateral surface faces the movable plate 51. Each rib 551 has a triangular outline when viewed laterally.

Figure 4:
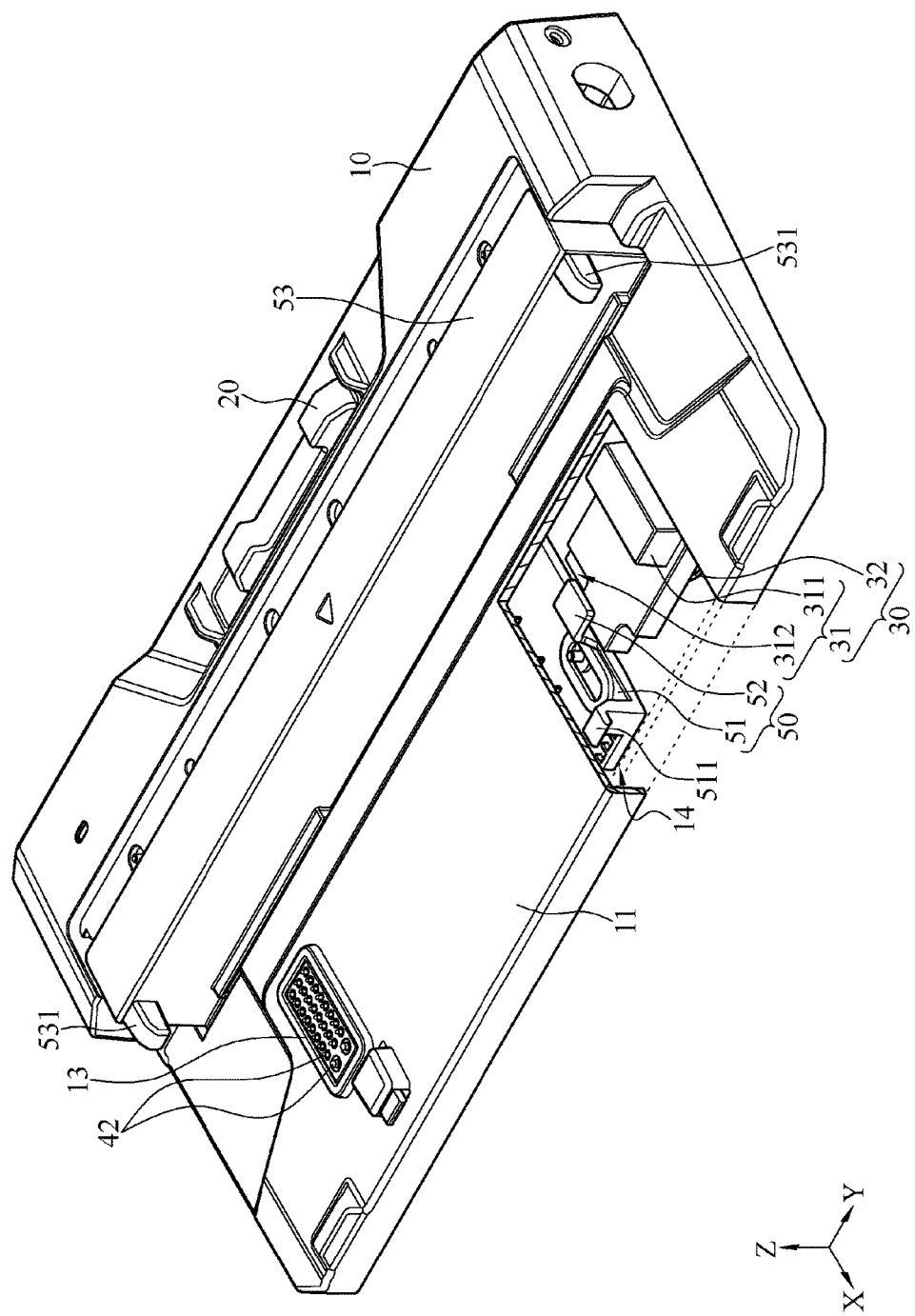
FIG. 4 is a perspective view of the dock at a connected position, with a tablet omitted, according to an embodiment of the present invention.
Figure 5:
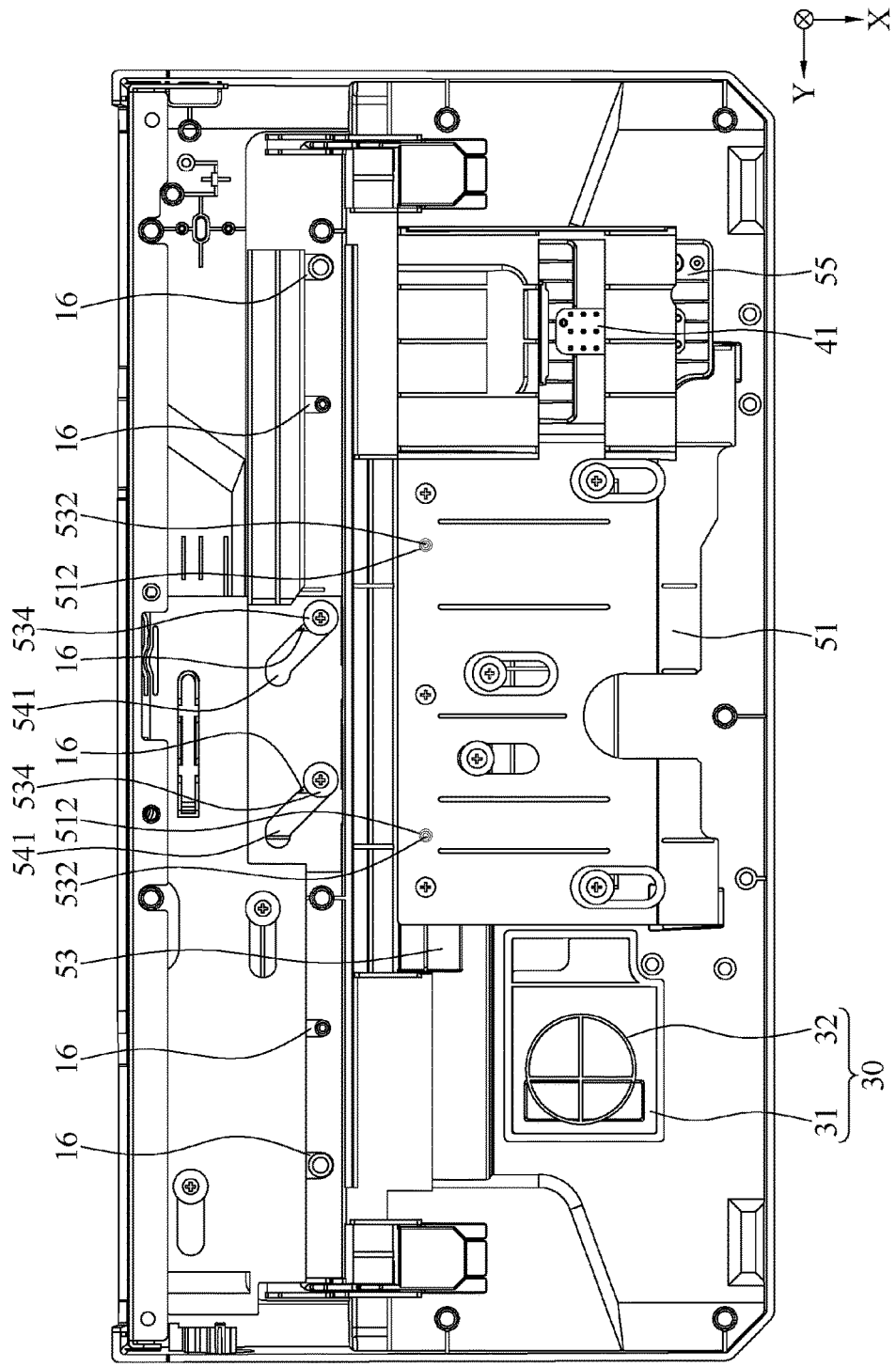
FIG. 5 is a schematic view of the inside of the dock which hides the bottom casing of the base when the dock is located at the connected position according to an embodiment of the present invention.

Structures of the dock with its fixing switch at the initial position and relative positions thereof are described above. The operation of the dock is described below. Referring to FIGS. 4, 5, FIG. 4 is a perspective view of the dock in this embodiment, with a tablet omitted, and FIG. 5 is a schematic view of the inside of the dock which hides the bottom casing of the base according to an embodiment of the present invention. Although the present invention is exemplified by a tablet, the present invention is not limited thereto; hence, the present invention is also applicable to any other electronic devices. When a user places the tablet on the upper surface 11 of the base 10, the casing of the tablet presses on the press portion 311 of the release switch 31 to bring the release switch 31 to the release position. When the release switch 31 is pressed on and brought to the release position, the stop portion 312 of the release switch 31 does not abut against and stop the engaging element 52 of the connection component 50, leaving the movable plate 51 movable.

Afterward, the user pushes and moves the fixing switch 20 to a connected position to not only allow the tablet to be fixed to the base 10, but also allow the connector 40 to protrude from the upper surface 11 of the base 10 and thus connect with the tablet. Referring to FIG. 4, when the fixing switch 20 is pushed and moved rightward (along y-axis), the fixing switch 20 drives the diversion guide element 54 to move along y-axis. Referring to FIG. 5, the fixing switch 20 moves along y-axis to the left of the diagram, driving the diversion guide element 54 to move along y-axis to the left of FIG. 5. At this point in time, the positioning elements 534 penetratingly disposed in the first guide groove 16 and the second guide groove 541 are moved from one end of the first guide groove 16 to the other end of the first guide groove 16 and from one end of the second guide groove 541 to the other end of the second guide groove 541. Referring to FIG. 2 and FIG. 4, when the fixing switch 20 of the dock is at the initial position, the positioning elements 534 are positioned above the first guide groove 16 and the second guide groove 541 as shown in the diagrams. After the diversion guide element 54 has moved leftward, the positioning elements 534 are guided by the second guide groove 541 to move downward as shown in the diagrams and guided by the first guide groove 16 to move in a direction parallel to x-axis.

Referring to FIG. 2, the positioning elements 534 are moved downward along x-axis to drive the fastening element 53 to move downward along x-axis. With the fastening element 53 being rectangular, its movement is guided also by the rail 15 disposed on the upper surface 11 of the base 10. Referring to FIG. 4, after the fastening element 53 has moved downward, the fastening portion 531 of the fastening element 53 is fastened to the upper surface of the tablet to hold the tablet.

Referring to FIG. 5, after the fastening element 53 has moved downward, the movable plate 51 connected to the fastening element 53 is moved downward along x-axis to the connected position. Referring to FIG. 4, since the release switch 31 is pressed on by the tablet to move toward negative values on z-axis, the stop portion 312 goes away from the engaging element 52 and thus no longer abuts against and stops the engaging element 52. Therefore, the movable plate 51 is driven to move downward along x-axis.

The movable plate 51 is moved to the connected position to drive the push element 55 to move toward the upper surface 11 of the base 10, not only allowing the push element 55 to abut against the circuit board 41, but also allowing the spring connectors 42 to protrude from the upper surface 11 of the base 10. In this embodiment, the ribs 551, each of which has a triangular outline when viewed laterally, are disposed on the push element 55 and face the movable plate 51. The triangular ribs 551 are increasingly closer to the movable plate 51 in a top-to-bottom manner. Therefore, the movable plate 51 moves along the hypotenuse of each rib 551 while moving downward, thereby pushing the push element 55 toward positive values on z-axis. At this point in time, the push element 55 abuts against the circuit board 41, and the spring connectors 42 disposed on the circuit board 41 move toward positive values on z-axis to protrude from the upper surface 11 of the base 10, thereby allowing the spring connectors 42 to connect with connection terminals (not shown) on the tablet.

When the movable plate 51 is moved downward, the two hooks 511 of the movable plate 51 are pushed and protruded from the upper surface 11 of the base 10, as shown in FIG. 4. The two hooks 511 are fastened to holes (not shown) on the casing of the tablet. Therefore, when mounted on the dock, the tablet is unlikely to separate from the dock, because of the fastening portion 531 of the fastening element 53 and the hooks 511 of the movable plate 51.

To disconnect the tablet from the dock, the user pushes and moves the fixing switch 20 to the initial position, allowing the fixing switch 20 to drive the diversion guide element 54, the diversion guide element 54 to drive the fastening element 53, and the fastening element 53 to drive the movable plate 51 to restore its initial state. Since the movable plate 51 restores its initial state and thus no longer abuts against the push element 55, the second resilient element 43 disposed between the circuit board 41 and the base 10 drives the circuit board 41 to move toward negative values on z-axis, allowing the spring connectors 42 to move toward negative values on z-axis and not protrude from the upper surface 11 of the base 10. Therefore, the fastening portion 531 of the fastening element 53 and the hooks 511 of the movable plate 51 no longer hold the tablet, and in consequence the tablet can be removed from the dock. Since the spring connectors 42 have returned to the receiving space 14 of the base 10 and thus do not protrude from the upper surface 11 of the base 10, the spring connectors 42 are unlikely to be hit and damaged in the course of removal of the tablet.

When the tablet is absent from the upper surface 11 of the base 10, the pressing force otherwise exerted on the release switch 31 disappears. At this point in time, under the restoring force exerted by the first resilient element 32, the release switch 31 is moved toward positive values on z-axis, returning to its initial state, that is, protruding from the upper surface 11 of the base 10.

Given the aforesaid structures, when the tablet is not mounted on the dock, the release switch 31 is at the stop position, and the release switch 31 renders the fixing switch 20 unmovable, allowing the connector 40 to be received in the base 10 without protruding from the upper surface 11 of the base 10. Therefore, the connector 40 is unlikely to be damaged while the dock is being carried around, regardless of whether the upper surface 11 of the dock is hit by any object.

To mount the tablet on the dock, the user places the tablet on the upper surface 11 of the base 10 so that the tablet presses on the release switch 31 to enable the release switch 31 to move to the release position. Afterward, the user operates the fixing switch 20 so that the fixing switch 20 drives the connection component 50 to move to the connected position. At this point in time, the connector 40 is pushed by the connection component 50 to protrude from the upper surface 11 of the base 10 and connect with the tablet disposed on the upper surface 11 of the base 10; hence, the connector 40 is unlikely to be damaged while the dock is being carried around. It is only after the user has correctly positioned the tablet on the base 10 that the user can operate the fixing switch 20, allowing the connector 40 to protrude from the upper surface 11 of the base 10 and thus connect with the tablet; hence, the tablet is correctly positioned on the base 10 to protect the connector 40 against damage. Moreover, it is only after the user has pressed and moved the release switch 31 to the release position that the fixing switch 20 can be moved; hence, it is feasible to preclude the situation where, while the dock is being carried around, the fixing switch 20 is inadvertently pushed, causing the connector 40 to protrude from the upper surface 11 of the base 10 and thus get damaged.

Securing structures for holding and fixing the tablet in place, such as the fastening portion 531 of the fastening element 53, the hooks 511 of the movable plate 51, and the connection component 50 for driving the connector 40, are put together; hence, the user merely needs to take a single action (i.e., pushing the fixing switch 20) in order to simultaneously perform two operations, namely holding/fixing the tablet in place and electrically connecting the tablet to a power supply. Accordingly, the dock of the present invention features ease of use.

Although the present invention is disclosed above by embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. A dock, comprising:
a base having a press aperture and a connection aperture which are penetratingly disposed on an upper surface of the base, the base having therein a receiving space;
a fixing switch penetratingly disposed on the upper surface of the base;
a release component comprising a release switch and a resilient element, the release switch having a press portion and a stop portion, the press portion passing through the press aperture to protrude from the upper surface of the base, with the stop portion received in the receiving space, the resilient element being received in the receiving space to abut against the release switch and drive the release switch to move to one of a stop position and a release position;
a connector received in the receiving space of the base and corresponding in position to the connection aperture; and
a connection component disposed at the base to connect the fixing switch and the connector, the connection component comprising a movable plate and an engaging element, wherein, when the release switch is at the stop position, the stop portion abuts against the engaging element and stops the movable plate, the connector, and the fixing switch from moving, wherein, when the release switch is at the release position, the fixing switch is moved to a locked position to drive the connection component to move to a connected position, allowing the connection component to push an end of the connector so that the end of the connector passes through the connection aperture to protrude from the upper surface of the base.

2. The dock of claim 1, wherein the movable plate further comprises two hooks which protrude to the upper surface of the base as soon as the fixing switch moves to the locked position and drives the connection component to move.

3. The dock of claim 1, wherein the connection component further comprises a fastening element with an end extending to the receiving space and connecting with the movable plate and another end disposed at the upper surface of the base to connect with the fixing switch, the fastening element having a fastening portion.

4. The dock of claim 3, wherein the connection component further comprises a diversion guide element received in the receiving space to connect the fixing switch and the fastening element and allow the fixing switch and the fastening element to move in directions perpendicular to each other, respectively.

5. The dock of claim 4, wherein the base further comprises a first guide groove, the diversion guide element comprises a second guide groove, and the fastening element has a positioning element passing through and slidingly disposed in the first guide groove and the second guide groove.

6. The dock of claim 3, wherein the base further has a rail, and the fastening element has a U-shaped slot slidingly disposed in the rail.

7. The dock of claim 3, wherein the fastening portion is provided in form of two protruding posts.

8. The dock of claim 1, wherein the connector comprises a circuit board, a plurality of spring connectors, and another resilient element, with the spring connectors disposed on the circuit board and corresponding in position to the connection aperture, and the other resilient element snugly fitted between the base and the circuit board.

9. The dock of claim 1, wherein the connection component further comprises a push element disposed between the movable plate and a circuit board of the connector, wherein, when the movable plate moves to the connected position, the push element abuts against the circuit board to allow a plurality of spring connectors to protrude from the upper surface of the base.

10. The dock of claim 9, wherein the push element has a plurality of ribs, and the ribs each have a triangular outline when viewed laterally.

* * * * *